US008788845B1

(12) United States Patent
Satish

(10) Patent No.: US 8,788,845 B1
(45) Date of Patent: *Jul. 22, 2014

(54) DATA ACCESS SECURITY

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/525,105

(22) Filed: Jun. 15, 2012

Related U.S. Application Data

(63) Continuation of application No. 11/245,776, filed on Oct. 6, 2005, now Pat. No. 8,225,104.

(51) Int. Cl.
G06F 21/00 (2013.01)
G06F 21/54 (2013.01)
G06F 21/62 (2013.01)
H04L 9/32 (2006.01)

(52) U.S. Cl.
CPC ............... *G06F 21/00* (2013.01); *G06F 21/54* (2013.01); *G06F 21/62* (2013.01); *H04L 9/32* (2013.01)
USPC .............................. 713/189; 726/30; 709/225

(58) Field of Classification Search
USPC ............................................ 713/189; 726/30
See application file for complete search history.

(56) References Cited

U.S. PATENT DOCUMENTS

| 7,131,143 | B1 * | 10/2006 | LaMacchia et al. | 726/30 |
| 2002/0174224 | A1 * | 11/2002 | Scheifler et al. | 709/225 |
| 2004/0196494 | A1 * | 10/2004 | Binder | 358/1.15 |
| 2005/0198412 | A1 * | 9/2005 | Pedersen et al. | 710/30 |
| 2005/0254475 | A1 * | 11/2005 | Kubler et al. | 370/338 |

OTHER PUBLICATIONS

Brown, "Security in Longhorn: Focus on Least Privilege", 2004, Microsoft, p. 1-8.*
Silowash, "Insider Threat Control: Using Universal Serial Bus (USB) Device Auditing to Detect Possible Data Exfiltration by Malicious Insiders", Jan. 1, 2013, Carnegie Mellon University, p. 1-23.*

* cited by examiner

*Primary Examiner* — Mahfuzur Rahman
*Assistant Examiner* — Gregory Lane
(74) *Attorney, Agent, or Firm* — Fenwick & West LLP

(57) ABSTRACT

An execution environment of a computer computes an initial effective permissions set for managed code based on user identity evidence, code evidence and/or a security policy and executes the code with this permissions set. If the managed code requests a data access, the execution environment considers data evidence that indicates the trustworthiness of the requested data. The data evidence can be based on the source of the data, the location of the data, the content of the data itself, or other factors. The execution environment computes a new effective permissions set for the managed code based on the data evidence and the security policy. This new effective permissions set is applied to the managed code while the code accesses the data. The execution environment restores the initial permissions set once the managed code completes the data access.

20 Claims, 5 Drawing Sheets

US 8,788,845 B1

DATA ACCESS SECURITY

CROSS-REFERENCE TO RELATED APPLICATIONS

This application is a continuation of U.S. patent application Ser. No. 11/245,776, filed Oct. 6, 2005, the entire contents of which are hereby incorporated by reference.

BACKGROUND OF THE INVENTION

1. Field of the Invention

This invention pertains in general to computer security and in particular to determining the set of permissions to grant an executing process.

2. Description of the Related Art

Computer security has become increasingly important in recent times. Server computers that store confidential data, such as credit card numbers or medical records, must be protected from attempts by malicious attackers to obtain the data. Likewise, other computers such as home computers must be protected from malicious software including viruses, worms, spyware, Trojan horse programs, and other similar threats that an end-user is likely to encounter when connected to the Internet. Modern operating systems, such as Unix, Linux, and MICROSOFT WINDOWS XP incorporate security paradigms that are intended to protect the computers from malicious behaviors.

Until recently, computer security paradigms relied on the concept of "transitive security" to protect the computer. A end-user having a defined role is assigned a set of permissions by the operating system. All code executed by that user always has the same set of permissions as the end-user. Transitive security can be problematic if an end-user having broad permissions executes malicious software because the malicious software will also have broad permissions.

Newer operating systems support paradigms that specify the permissions based at least in part on the code itself. Microsoft's new operating systems, for example, provide a feature called ".NET Security.".NET Security is based on three aspects: 1) managed code; 2) identity/role-based security; and 3) code evidence-based security. Managed code is supervised by the operating system as it is executed to ensure that it does not perform any operations that exceed the scope of its permissions. Identity/role-based security means that the code has permissions defined in part by the identity and role of the end-user that executes the code. Under code evidence-based security, the permissions of the code are determined in part by the trustworthiness of the code itself.

However, the code and end-user are not the only entities on the computer that can instigate malicious behavior. Many attacks on computers are instigated by data, or by executable code that is disguised within data. The data are specially-crafted to exploit a vulnerability of legitimate code that processes the data. The exploit causes the legitimate code to perform a malicious action and/or transfers execution to malicious code hidden within the data. If both the end-user and legitimate code are trusted, the malicious activities can cause considerable damage to the computer.

Therefore, there is a need in the art for a way to protect computers from malicious data and/or malicious code disguised as data.

BRIEF SUMMARY OF THE INVENTION

The above need is met by an execution environment that can temporarily reduce the effective permissions granted to a process while the process accesses untrustworthy data.

The execution environment computes an initial effective permissions set for managed code based on user identity evidence, code evidence and/or a security policy and executes the code as a process having the permissions set. If the managed code requests a data access, the execution environment considers data evidence that indicates the trustworthiness of the requested data. The data evidence can be based on the source of the data, the location of the data, the content of the data, or other factors.

The execution environment computes a new effective permissions set for the managed code based on the data evidence and the security policy. This new effective permissions set is applied to the managed code while the code accesses the data. The execution environment restores the initial permissions set once the managed code completes the data access.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
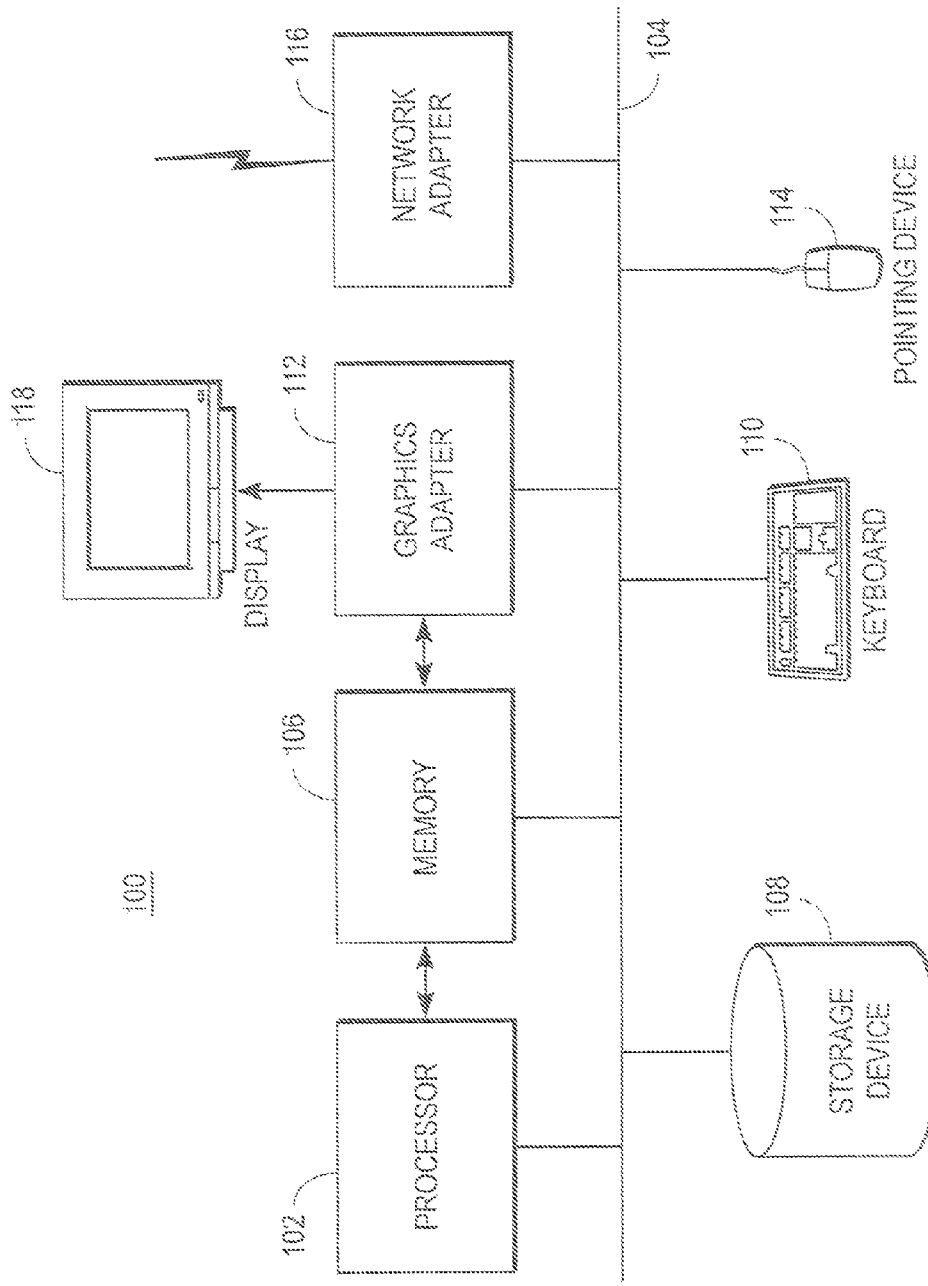
FIG. 1 is a high-level block diagram showing a computer for executing computer programs in a managed execution environment according to one embodiment.

FIG. 1 is a high-level block diagram showing a computer 100 for executing computer programs in a managed execution environment according to one embodiment. Illustrated are at least one processor 102 coupled to a bus 104. Also coupled to the bus 104 are a memory 106, a storage device 108, a keyboard 110, a graphics adapter 112, a pointing device 114, and a network adapter 116. A display 118 is coupled to the graphics adapter 112. Computer acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

As is known in the art, the computer 100 is adapted to execute computer program modules. As used herein, the term "module" refers to computer program logic for providing the specified functionality. A module can be implemented in hardware, firmware, and/or software. A module is typically stored on the storage device 108, loaded into the memory 106, and executed by the processor 102.

Figure 2:
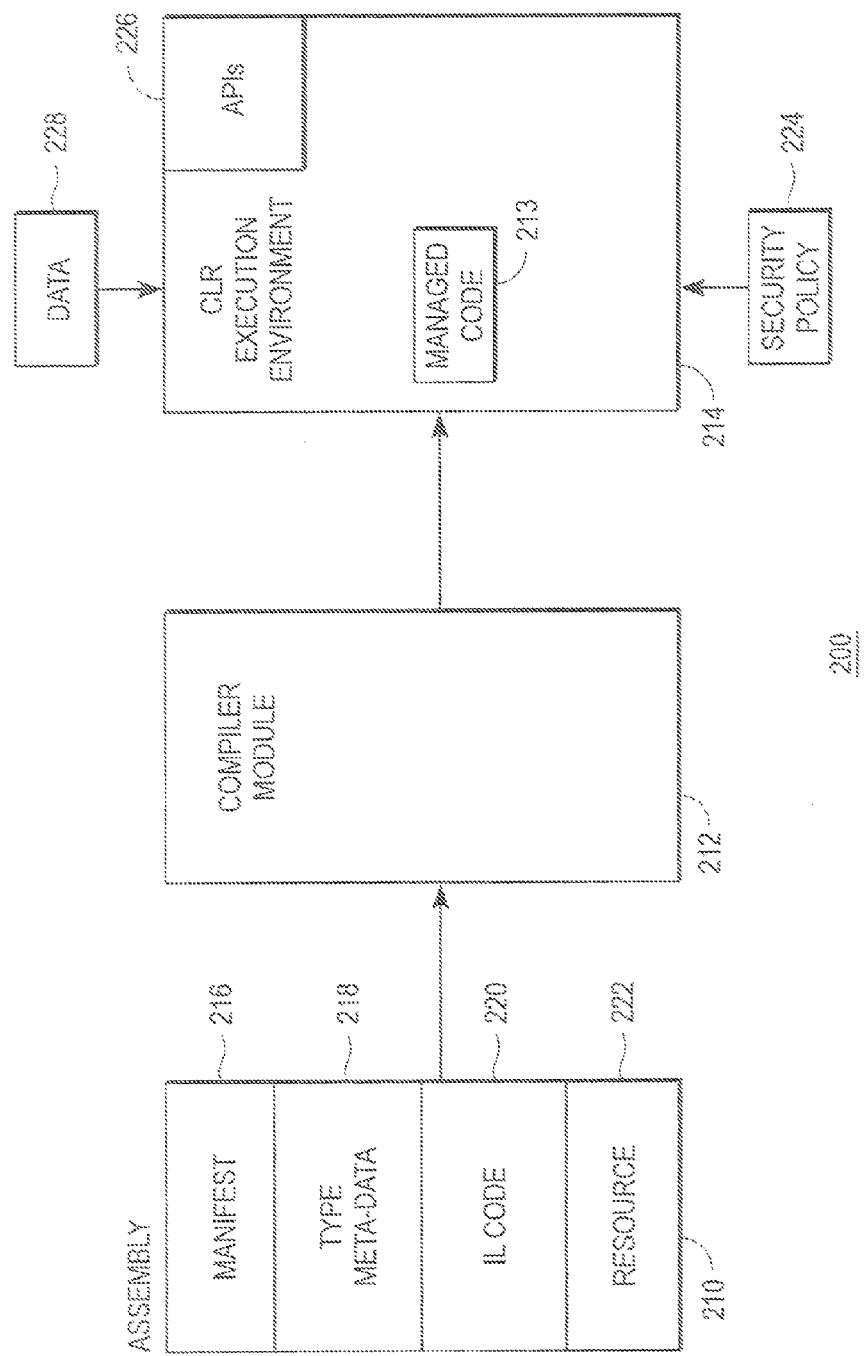
FIG. 2 is a high-level block diagram illustrating a logical view of a security paradigm including a common language runtime (CLR) managed execution environment.

FIG. 2 is a high-level block diagram illustrating a logical view of a security paradigm 200 including a common language runtime (CLR) managed execution environment 214 for executing computer programs on computers like those described in FIG. 1. While this description assumes that a CLR 214 is executing managed code, those of skill in the art will recognize that the techniques described herein can be utilized in environments where the code is unmanaged and/or the CLR is absent.

Generally, the security paradigm 200 includes an assembly 210 that is compiled by a compiler module 212 to execute in the CLR 214. The assembly 210 includes a manifest 216 that contains a collection of metadata describing how the other elements in the assembly 210 relate to each other. The metadata in the manifest 216 specify the assembly's version and security requirements, and information needed to define the scope of the assembly 210 and resolve references to resources and classes. To this end, the manifest 216 can describe entry points of code, a hash of the assembly 210 or other data useful for integrity checking, dependent assemblies, locations of data utilized by the assembly, etc. In one embodiment, the manifest 216 is encoded in an extensible markup language (XML) document.

The assembly 210 also includes type metadata 218 that describe the data types that are used in the assembly. Further, the assembly 210 includes intermediate-language (IL) code 220, such as Microsoft Intermediate Language (MSIL) code. Typically, the IL code is emitted by a compiler based on source code written in a standard programming language such as C++. The assembly 210 may contain resources 222 that are used by the IL code 220.

The compiler module 212 in the security paradigm 200 produces managed code 213 for the computer 100 from the IL code 220 in the assembly 210. The compiler module 212 can be a just-in-time compiler that produces the managed code 213 at runtime. The managed code 213 contains instructions in the native format of the computer 100 (i.e., of the processor 102) and includes functionality for performing tasks such as traps and garbage collection, exception handling, type safety, array bounds and indexing checking, etc.

The CLR 214 is a managed execution environment for executing managed code as processes on the computer 100. In one embodiment, the CLR 214 is provided by a Windows-based operating system from MICROSOFT CORPORATION, but in other embodiments the CLR 214 is provided by LINUX, UNIX, or other operating systems. As used herein, the term "CLR" refers to any common language runtime infrastructure having the characteristics described herein, and does not necessarily refer to a particular implementation.

The CLR 214 receives the manifest 216 from the assembly 210 and a security policy 224. The security policy specifies 224 permission sets that can be granted to code executing in the CLR 224. The CLR 214 uses the manifest 216 and the security policy 224 to compute the effective permissions set for the managed code 213 produced by the compiler module 212. In one embodiment, the security policy 224 specifies that different permissions sets should be applied to managed code 213 that accesses data having different levels of trustworthiness.

The CLR 214 loads the managed code 213 into a domain having the computed permissions and executes the code as a process within that domain. During execution, the managed code 213 will typically make calls to application program interfaces (APIs) 226 provided by the CLR 214. These APIs 226 can include managed APIs, such as the WinFX APIs provided by some MICROSOFT operating systems.

The managed code 213 uses the APIs 226 to access data 228 during its execution. The data 228 can come from a variety of different sources, such as a storage device 108 on the computer 100, a shared drive on an other computer connected to the computer 100 via a local area network (LAN), and/or from the Internet. The data 228 pose a security risk because the data might include malicious software or trigger a malicious action by the native instructions within the managed code 213. Therefore, one embodiment of the CLR 214 evaluates evidence associated with the data 228 to ascertain whether the data are trustworthy. If the evidence indicates that the data are not trustworthy, the CLR 214 temporarily reduces the permissions granted to the managed code 213 as specified by the security policy 224. The CLR 214 restores the permissions to the managed code 213 once the code completes its processing of the data.

Figure 3:
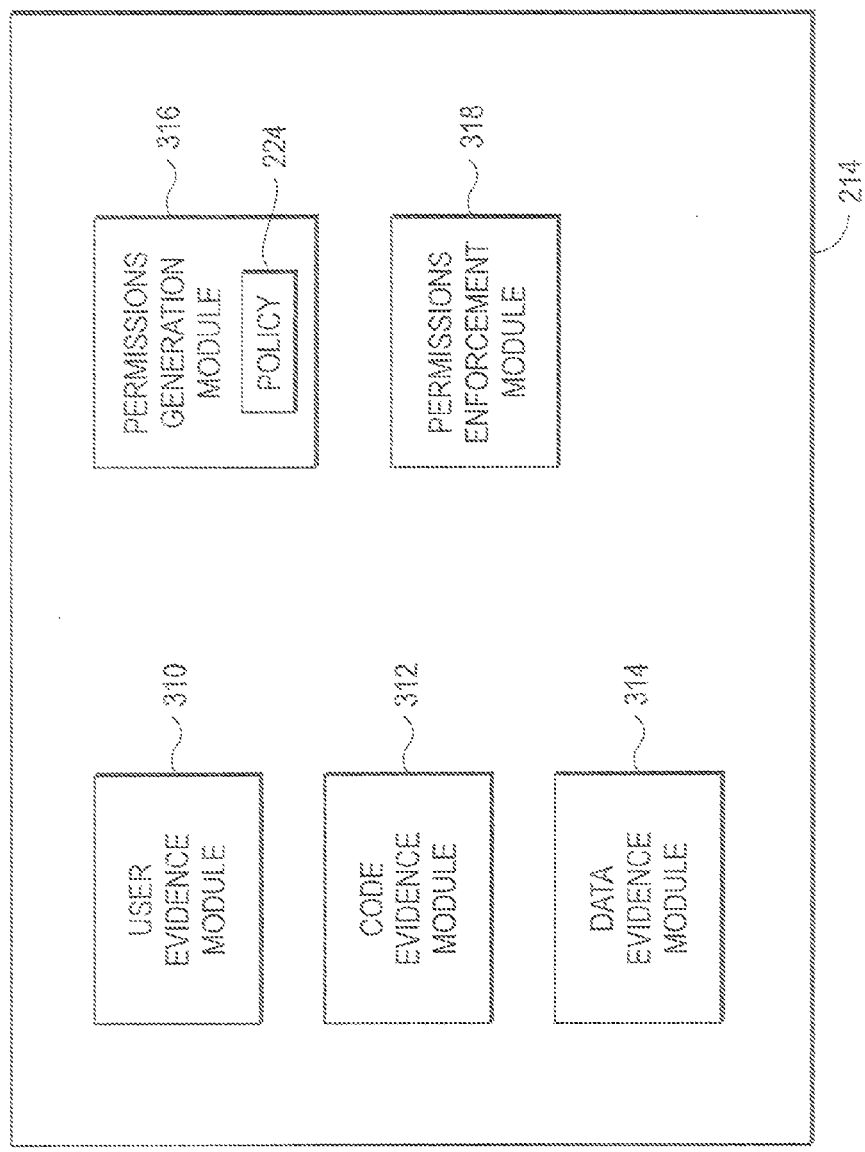
FIG. 3 is a high-level block diagram illustrating a more detailed view of the CLR according to one embodiment.

FIG. 3 is a high-level block diagram illustrating a more detailed view of the CLR 214 according to one embodiment. Those of skill in the art will recognize that other embodiments can have additional and/or different modules than the ones shown in FIG. 3. Moreover, the functionalities can be distributed among the modules in a manner different than is describe here. Additionally, some or all of the modules illustrated in FIG. 3 can be located in entities other than the CLR 214. In some embodiments, the functions performed by some of the modules are provided by other entities of the MICROSOFT .NET Security platform.

A user evidence module 310 is adapted to evaluate user identity evidence in order to enable the CLR 214 to calculate an effective permissions set for the managed code 213. In one embodiment, the user evidence module 310 is adapted to determine the identity of an end-user on whose behalf the computer 100 executes the managed code 213. In one embodiment, the user evidence module 310 queries the operating system to ascertain the end-user's identity, along with other information such as the roles assigned to the end-user. For example, the user evidence module 310 can determine that an end-user has the "administrator," "power user," or "limited user" role.

A code evidence module 312 is adapted to evaluate code evidence in order to enable the CLR 214 to calculate an effective permissions set for the managed code 213. In one embodiment, the code evidence module 312 reads the manifest 216 in the assembly 210 to ascertain characteristics of the code. The manifest 216 provides information such as the provider of the code, the capabilities of the code, the permissions that the code requires to execute properly, etc. In some embodiments, the code evidence module 312 also queries the operating system and/or other entities in the computer 100 to gather additional information about the code, such as from where it is being executed, whether it is signed and what entity signed it, etc. Based on the manifest 216 and/or other evidence, the code evidence module 312 assigns the managed code 213 to a code group. For example, the possible code groups to which the managed code 213 can be assigned include "Internet," "intranet," "local storage," and "signed."

A data evidence module 314 is adapted to evaluate data evidence to determine the trustworthiness of the data. The trustworthiness is utilized by the CLR 214 to calculate an effective permissions set for the managed code 213 while the code accesses the data. In one embodiment, the data evidence module 314 is activated when the managed code utilizes the APIs 226 to access data 228.

In one embodiment, the data evidence module 314 uses the source of the data as an indicator of the data's trustworthiness. The data source is determined from the path, URL, or other location information provided by the managed code 213 in its request to access the data. The location information indicates whether the data 228 are stored locally or remotely, and also provides more detailed information such as the directory in which the data are located. A URL, if provided by the managed code 213, encodes additional information that can be used to determine the source of the data. For example, a URL can encode the protocol for accessing the data, the computer that holds the data (whether on a network or local), and a path, database query, or other information that is used to request the data from the computer.

In another embodiment, the data evidence module 314 determines the source directly from the data. For example, the program or other entity that creates the data can place information in a header or other area of the data file 228 that explicitly describes the data's source. The information can include a digital signature to further authenticate the source and/or data. Further, the information can identify the creator of the data, such as the end-user and/or roles of the person who used the application to create the data.

In one embodiment, the data evidence module 314 analyzes the data to ascertain its trustworthiness. For example, the data evidence module 314 can determine the format in which the data are encoded and infer the source based on the encoding. If the encoding of the data is unexpected, e.g., the data does not match a format specified by its file extension, the data evidence module 314 can treat this finding as evidence that the data are untrustworthy.

In one embodiment, the data evidence module 314 assigns the data 228 to a data group based on the source and/or other evidence of the data's trustworthiness. Each data group describes a level of trustworthiness. For example, one data group can represent data that is stored in a trusted directory on the local computer, another group can represent data stored on a machine on a local area network (such as on a shared drive), while a third group can represent data stored on the Internet. Likewise, one data group can represent data that explicitly identifies itself as being from a trusted source, while another data group can represent data that does not identify its source or fails other tests of trustworthiness.

A permissions generation module 316 generates effective permissions sets for the managed code 213 executed within the CLR 214. As described above, in one embodiment the effective permissions set is based on a security policy 224 received by the CLR 214. The security policy 224 specifies permissions that are granted to the managed code 213 based on the user, code, and/or data groups to which the code and data are assigned by the user 310, code 312, and data 314 evidence modules, respectively.

In one embodiment, the permissions generation module 316 determines the user and code groups for the managed code 213 and then computes the effective permissions set for the managed code based on the security policy 224. Generally, the security policy 224 provides greater permissions for managed code 213 classified in more trustworthy groups and lesser permissions for managed code classified in less trustworthy groups. For example, for user groups, the security policy can specify that managed code 213 executed by an end-user in the "power user" group has greater permissions than code executed by an end-user in the "limited user" group. Similarly, for code groups, the security policy 224 can provide greater permissions for managed code 213 that is signed and/or executed from a local storage device 108, and lesser permissions for managed code that is unsigned and/or executed from a network.

When the managed code 213 requests access to data 228, the permissions generation module 316 determines the group to which the data are assigned, and computes a new set of effective permissions for the managed code 213 for data access. The new permissions are a subset of the code group permissions in one embodiment. As with the other groups, the security policy 224 specifies relatively greater permissions for the managed code 213 when the code is accessing data classified in a more trustworthy group and lesser permissions when the code is accessing data classified in a less trustworthy group. In one embodiment, the data groups, in order of decreasing trustworthiness, are: data on a local storage device 108 or authenticated as being from a trusted source; data from a local network; and data from the Internet or another remote source.

A permissions enforcement module 318 enforces the effective permissions set on the managed code 213. The module 318 allows the managed code 213 to perform actions for which it has permission, but blocks any actions that exceed the scope of the permissions. Upon blocking an action, the permissions enforcement module 318 can terminate the offending process, present a dialog box or other user interface element that allows the end-user to temporarily grant the managed code 213 permission to perform the action, notify an administrator, and/or perform another action.

Figure 4:
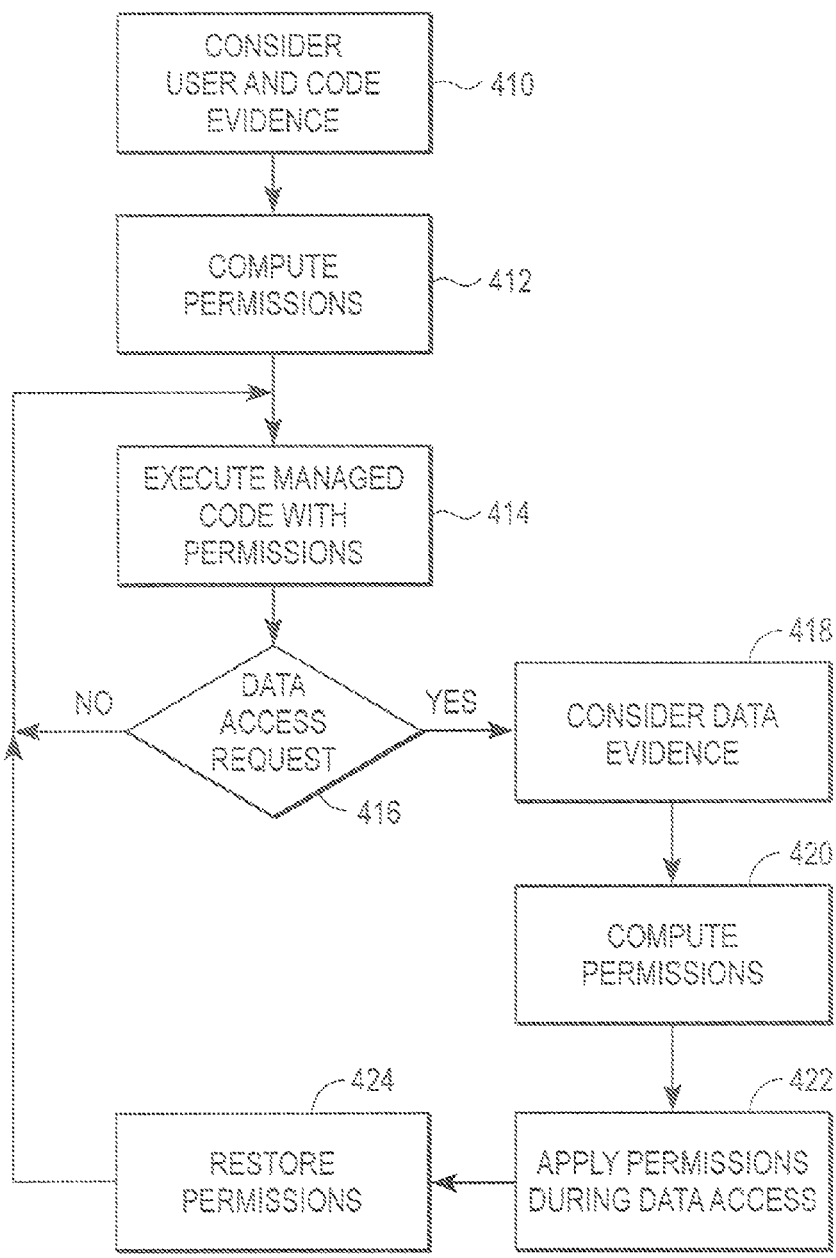
FIG. 4 is a flowchart illustrating steps utilizing data evidence security according to one embodiment.

FIG. 4 is a flowchart illustrating steps utilizing data evidence security according to one embodiment. These steps can be performed by the CLR 214 and/or by other entities. Those of skill in the art will recognize that other embodiments can perform the steps in different orders. Likewise, other embodiments can contain other and/or additional steps than the ones shown in FIG. 4.

Initially, managed code is selected for execution on the computer 100. The CLR 214 receives the managed code 213 and considers 410 the user identity and code evidence associated with it. The user identity evidence can indicate, for example, that the end-user caused the managed code 213 to execute is assigned to the "power users" role. The code evidence can indicate that the managed code 213 is digitally-signed by a trustworthy source. The CLR 214 computes 412 the effective permissions set for the process based on the user evidence, the code evidence, and the security policy 224, and executes 414 the managed code 213 as a process using the permissions set.

Eventually, the managed code 213 uses the managed APIs 226 to request 416 access to data 228 stored on the computer 100 or elsewhere. The request identifies the data 228 by a URL, path, or other technique. In response, the CLR 214 considers 418 data evidence associated with the data 228 identified in the request. The data evidence indicates the relative trustworthiness of the data based on the source of the data and/or other characteristics.

The CLR 214 computes 420 an effective permissions set to apply to the managed code 213 for the data access based on the data evidence and the security policy 224. In one embodiment, the effective permissions set for the data access is a subset of the permissions calculated 412 based on the user and/or code evidence. The CLR 214 applies 422 the permissions to the managed code during the data access and thereby prevents the data from triggering malicious actions that might have been possible with the initial code evidence-based permissions set. In one embodiment, the CLR 214 applies the permissions to the managed code for a specified duration, such as for 1 minute after the data access or for the next x instructions after the data access. The duration is long enough to prevent the managed code 213 from performing a malicious action in response to the data access, but brief enough to not hinder legitimate actions that the managed code performs subsequent to the data access.

The CLR 214 restores 424 the permissions set for the managed code 213 at the end of the data access period. Upon restoration, the managed code has the effective permissions calculated 412 in response to the user and/or code evidence. If the managed code 213 accesses additional data, the CLR 214 will again analyze the data evidence and apply a new permissions set for the duration of the data access.

Figure 5:
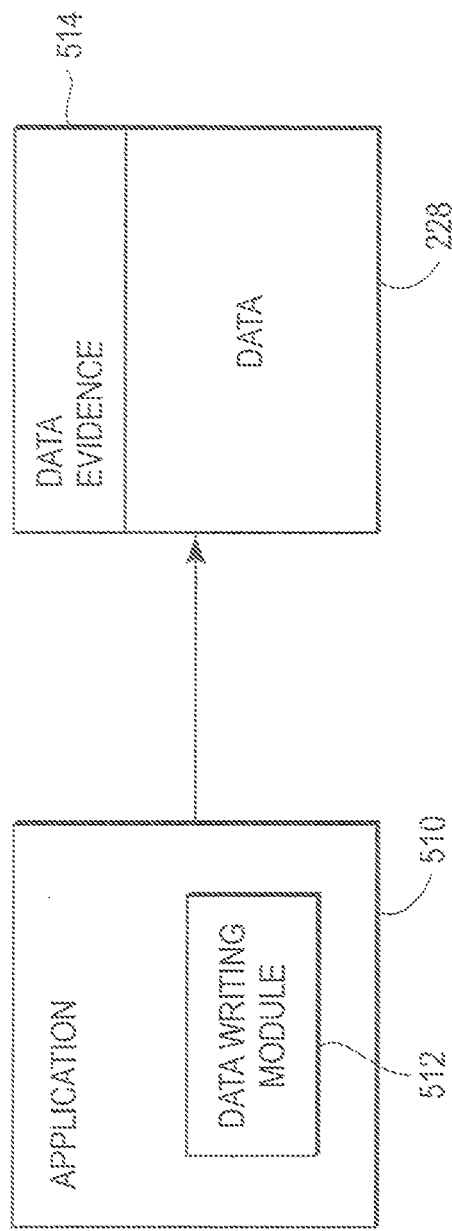
FIG. 5 is a high-level block diagram illustrating an application module for storing evidence of trustworthiness within a data file according to one embodiment.

FIG. 5 is a high-level block diagram illustrating an application module 512 for storing evidence of trustworthiness within a data file 228 according to one embodiment. The application module is, for example, a word processor, spreadsheet program, web development utility, and/or other application utilized to create data files.

The application module 510 includes a data writing module 512 for creating a file 228 and/or other representation of data that can be accessed by managed code 213 or other programs. In one embodiment, the data writing module 512 includes data evidence 514 with the other data. The data evidence 514 allows a program that subsequently examines the file 228 to evaluate the trustworthiness of the data contained therein. To this end, the data evidence 514 can include a digital signature, an identification of the application 510 and/or end-user that created the file, a declaration of the permissions that a program will require in order to process the data, etc.

In sum, the CLR 214 and/or another module detects when managed code 213 is attempting to access data 228. The CLR 214 evaluates the trustworthiness of the data 228 and calculates a reduced permission set, if necessary. The CLR 214 applies the reduced permission set to the managed code 213 for the duration of the data access. The reduced permissions prevent the data from initiating malicious actions on the computer 100.

The above description is included to illustrate the operation of the preferred embodiments and is not meant to limit the scope of the invention. Those of skill in the art will recognize that when the description refers to "an embodiment" or "another embodiment," it may be referring to the same and/or different embodiments. The scope of the invention is to be limited only by the following claims. From the above discussion, many variations will be apparent to one skilled in the relevant art that would yet be encompassed by the spirit and scope of the invention.

I claim:

1. A computer-implemented method for securing a computer, comprising:
   determining a user group associated with a user of the computer;
   considering code evidence indicating a trustworthiness of code on which a process executed on the computer by the user is based;
   computing an initial permissions set for the process responsive to the code evidence, the user group, and a security policy;
   applying the initial permissions set to the process;
   receiving a request from the process having the initial permissions set to access data;
   considering data evidence indicating a trustworthiness of the requested data;
   computing an effective permissions set for the process responsive to the code evidence, the user group, the data evidence and the security policy, wherein the effective permissions set is a subset of the initial permissions set;
   applying the effective permissions set to the process for the data access; and
   restoring the initial permissions set to the process responsive to completion of the data access.

2. The method of claim 1, wherein considering data evidence comprises:
   analyzing the requested data to ascertain the data's trustworthiness.

3. The method of claim 1, wherein considering code evidence comprises determining capabilities of the code, different capabilities of the code having different levels of trustworthiness.

4. The method of claim 1, wherein computing an effective permissions set for the process comprises:
   assigning the requested data to a data group based on the requested data's trustworthiness; and
   selecting an effective permissions set for the process from among a plurality of permissions sets described by the security policy responsive to the assigned data group.

5. The method of claim 1, further comprising:
   determining a format in which the requested data are encoded;
   inferring a source of the requested data based on the format of the data; and
   considering data evidence indicating a trustworthiness of the requested data based on the source of the requested data, wherein requested data from different sources have different levels of trustworthiness.

6. The method of claim 1, wherein considering data evidence comprises:
   determining whether the requested data are stored locally or remotely from the computer.

7. The method of claim 1, wherein considering data evidence comprises:
   determining whether the requested data are encoded in an unexpected format.

8. A system for securing a computer, comprising:
   a computer-readable storage medium storing executable computer program modules comprising:
      a user evidence module for determining a user group associated with a user of the computer;
      a code evidence module for considering code evidence indicating a trustworthiness of code on which a process executed on the computer by the user is based;
      a data evidence module for considering data evidence indicating a trustworthiness of data requested by the process;
      a permissions generation module for computing an initial permissions set responsive to the code evidence, the user group, and a security policy, applying the initial permissions set to the process, receiving a request from the process having the initial permissions set to access data, and computing an effective permissions set for the process responsive to the code evidence, the user group, the data evidence and the security policy, wherein the effective permissions set is a subset of the initial permissions set; and
      a permissions enforcement module for applying the effective permissions set to the process for the data access and restoring the initial permissions set to the process responsive to completion of the data access; and
   a processor for executing the computer program modules.

9. The system of claim 8, wherein the data evidence module is further adapted to:
   analyze the requested data to ascertain the data's trustworthiness.

10. The system of claim 8, wherein considering code evidence comprises determining capabilities of the code, different capabilities of the code having different levels of trustworthiness.

11. The system of claim 8, wherein the permissions generation module is further adapted to:
   assign the requested data to a data group based on the requested data's trustworthiness; and select an effective permissions set for the process from among a plurality of permissions sets described by the security policy responsive to the assigned data group.

12. The system of claim 8, wherein the data evidence module is further adapted to:
   determine a format in which the requested data are encoded;
   infer a source of the requested data based on the format of the data; and
   consider data evidence indicating a trustworthiness of the requested data based on the source of the requested data, wherein requested data from different sources have different levels of trustworthiness.

13. The system of claim 8, wherein considering data evidence comprises:
   determining whether the requested data are stored locally or remotely from the computer.

14. The system of claim 8, wherein considering data evidence comprises:
   determining whether the requested data are encoded in an unexpected format.

15. A non-transitory computer-readable storage medium having executable computer program instructions recorded thereon for securing a computer, comprising:
   a user evidence module for determining a user group associated with a user of the computer;
   a code evidence module for considering code evidence indicating a trustworthiness of code on which a process executed on the computer by the user is based;
   a data evidence module for considering data evidence indicating a trustworthiness of data requested by the process;
   a permissions generation module for computing an initial permissions set responsive to the code evidence, the user group, and a security policy, applying the initial permissions set to the process, receiving a request from the process having the initial permissions set to access data, and computing an effective permissions set for the process responsive to the code evidence, the user group, the data evidence and the security policy, wherein the effective permissions set is a subset of the initial permissions set; and
   a permissions enforcement module for applying the effective permissions set to the process for the data access and restoring the initial permissions set to the process responsive to completion of the data access.

16. The computer-readable storage medium of claim 15, wherein the data evidence module is further adapted to:
   analyze the requested data to ascertain the data's trustworthiness.

17. The computer-readable storage medium of claim 15, wherein considering code evidence comprises determining capabilities of the code, different capabilities of the code having different levels of trustworthiness.

18. The computer-readable storage medium of claim 15, wherein the permissions generation module is further adapted to:
   assign the requested data to a data group based on the requested data's trustworthiness; and
   select an effective permissions set for the process from among a plurality of permissions sets described by the security policy responsive to the assigned data group.

19. The computer-readable storage medium of claim 15, wherein the data evidence module is further adapted to:
   determine a format in which the requested data are encoded;
   infer a source of the requested data based on the format of the data; and
   consider data evidence indicating a trustworthiness of the requested data based on the source of the requested data, wherein requested data from different sources have different levels of trustworthiness.

20. The computer-readable storage medium of claim 15, wherein considering data evidence comprises:
   determining whether the requested data are encoded in an unexpected format.

* * * * *